United States Patent
Fong et al.

(10) Patent No.: US 6,480,864 B1
(45) Date of Patent: Nov. 12, 2002

(54) RAM BASED DIRECTORY LAYER FOR A FLASH FILE SYSTEM

(75) Inventors: Albert Meng Fong, Fremont; Pradeep K. Kathail, Sunnyvale, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/334,041

(22) Filed: Jun. 15, 1999

(51) Int. Cl.[7] .............................................. G06F 17/30
(52) U.S. Cl. ......................................... 707/205; 707/2
(58) Field of Search ............................ 707/1–100, 200, 707/206, 205; 345/716, 760; 379/191, 193, 253, 255, 284; 717/1, 4, 11

(56) References Cited

U.S. PATENT DOCUMENTS

| | | | |
|---|---|---|---|
| 5,463,754 A | | 10/1995 | Beausoleil et al. .... 395/200.08 |
| 5,566,328 A | * | 10/1996 | Eastep ........................ 395/600 |
| 5,592,669 A | * | 1/1997 | Robinson et al. ........... 707/206 |
| 5,619,691 A | | 4/1997 | Katada et al. ............... 395/620 |
| 5,621,721 A | | 4/1997 | Vatuone ........................ 370/16 |
| 5,727,206 A | | 3/1998 | Fish et al. ................... 395/618 |
| 5,752,242 A | | 5/1998 | Havens ........................... 707/3 |
| 5,778,365 A | | 7/1998 | Nishiyama ...................... 707/9 |
| 5,950,205 A | * | 9/1999 | Aviani ......................... 707/103 |
| 6,021,415 A | | 2/2000 | Cannon et al. ............. 707/206 |

* cited by examiner

Primary Examiner—Diane D. Mizrahi
Assistant Examiner—Apu Mofiz
(74) Attorney, Agent, or Firm—Thelen Reid & Priest LLP; Marc S. Hanish

(57) ABSTRACT

A flash file system for use with flash cards and internetwork operating system software is provided. Absolute path names are stored in the name field of existing files on flash cards. When the system is initialized, a directory structure is created and stored in RAM by accessing the absolute path names stored in the name field of each file on the flash cards. Accessing a file on a flash card is then accomplished by traversing the directory structure in RAM, and going directly to the precise location of the file on the flash card, thereby minimizing the amount of information that must be retrieved from the flash cards and greatly increasing the speed of accesses. Additionally, cards designed for use with older, non-modular internetwork operating systems may still be used, as name fields for files in these flash cards may easily be used to store absolute path names.

18 Claims, 3 Drawing Sheets

RAM BASED DIRECTORY LAYER FOR A FLASH FILE SYSTEM

BACKGROUND OF THE INVENTION

1. Field of the Invention

The present invention relates to the field of internetwork operating system software. More specifically, the present invention relates to a RAM-based directory of a flash file system located in a software layer in an internetwork operating system.

2. The Background

An internetwork operating system (IOS), normally as software, provides a common functionality, scalability, and security for most or all devices on a network. It allows for the centralized, integrated, and automated installation and management of internetworks, while ensuring support for a wide variety of protocols, media, services, and platforms.

Devices that run IOS may have internal Flash or Personal Computer Memory Card International Association (PCMIA) slots that can hold flash cards. A flash card is a card containing memory that holds its content without power. Throughout this application, the term "flash card" is used, but one of ordinary skill in the art will recognize that other types of non-volatile memory may be used instead of flash cards, including Electrically Erasable Programmable Read Only Memories (EEPROMs), and other firmware chips. In IOS, generally executable images or configuration in files regarding the device are stored on these flash cards.

Obviously, when files are stored in a memory, there must be a mechanism for retrieving the files. Typical IOS software provides a minimal or no directory for such files stored in flash card on a device. FIG. 1 is a block diagram illustrating flash cards in a typical device. Device 10 may have PCMIA slots 12, 14 (hereinafter called "slot a", and "slot b", respectively). Flash cards 16, 18 may be inserted into PCMIA slots 12, 14, respectively. The typical IOS software will have no independent directory for files stored on any of these flash cards.

FIG. 2 is a diagram illustrating a flash card and flash card accessing module as typically used in IOS software. Flash card 50 may reside in a PCMIA or similar slot in the device. Flash card 50 may contain a data structure 52 (here termed fslib_device_info_block), which contains information on the format, size, and other attributes of the flash card. Additionally, flash card 50 may contain multiple files 54, each residing in addresses which can be measured by the offset 56 from the beginning of the flash card. A flash driver 58, may reside on the device or otherwise separated from the card and contain information regarding how to access the flash card.

Accessing a file stored on the card in a slot may be performed by providing the slot name and file name to the IOS. For example, a request for a file named "file2" in the card located in slot b of a device may be presented to the IOS in the form "slot_b:file2". IOS software may then reference the flash driver 58 corresponding to the card in slot b, and request information on the offset for file 2. In the illustration in FIG. 2, the offset would be returned as "3". Then the IOS could access the flash card, providing an offset of 3 to find the location of file 2. File 2 could then be read. The file may itself contain a header and a data portion, with the header containing fields set aside for the name of the file, size of the file, and other attributes.

This type of directory structure (it is referred to as a directory structure even though it arguably contains no directories at all) suffers from many drawbacks. First, it lacks the ability to have a true directory structure (with directories and subdirectories) forming a "tree" type hierarchical structure. Additionally, the "directory" is limited in that the name for slot a must always be "slot_a". There is not an opportunity to have a different, more creative, or more efficient name for the directories.

Perhaps the biggest drawback, however, of the typical flash file system is evident when one attempts to use it with a more advanced IOS software. IOS software has been evolving quickly. It is now possible to have IOS software be modular, where any component, such as a software module, can be swapped out and replaced without causing an interruption in the entire system (for example, where an old module is replaced with a newer one). For this to occur, it is necessary to have flexible storage of files on Flash cards in a hierarchical format, so that what is old and what is new can be organized in many levels of complexity. Without modification or additional components, the "directory" structure outlined above would not work with such a modular system.

What is needed is a flash file system that may be used with modular IOS software.

SUMMARY OF THE INVENTION

A flash file system for use with flash cards and internetwork operating system software is provided. Absolute path names are stored in the name field of existing files on flash cards. When the system is initialized, a directory structure is created and stored in RAM by accessing the absolute path names stored in the name field of each file on the flash cards. Accessing a file on a flash card is then accomplished by traversing the directory structure in RAM, and going directly to the precise location of the file on the flash card, thereby minimizing the amount of information that must be retrieved from the flash cards and greatly increasing the speed of accesses. Additionally, cards designed for use with older, non-modular internetwork operating systems may still be used, as name fields for files in these flash cards may easily be used to store absolute path names.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons after a review of this disclosure.

In accordance with a presently preferred embodiment of the present invention, the components, processes and/or data structures are implemented using an Internetwork Operating System and other services in a network. Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

The present invention utilizes a UNIX-style tree-structured organization as the directory hierarchy model. As such, the root is indicated by the forward slash character ("/"). Below the root directory, all directories can contain either directories or regular files. One of ordinary skill in the art will recognize the UNIX style of directories and that the present invention, while using such directories, should not be limited to a UNIX implementation.

Figure 1:
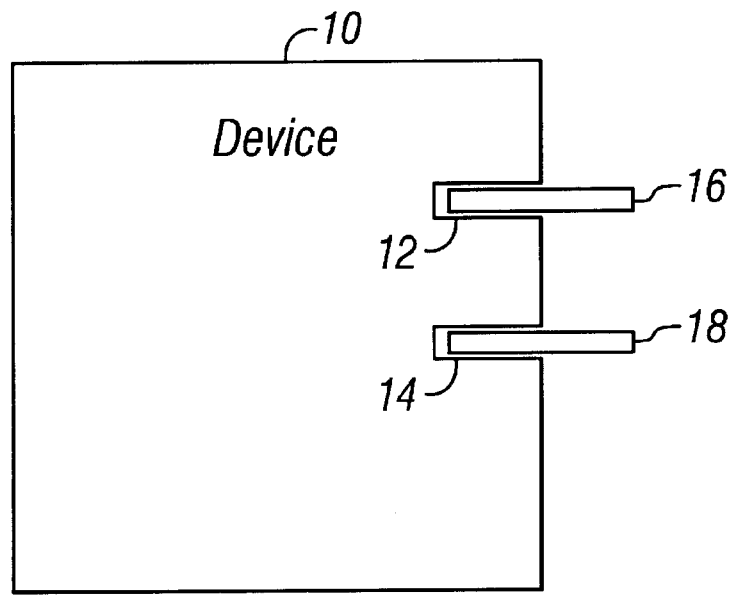
FIG. 1 is block diagram illustrating flash cards in a typical device.
Figure 2:
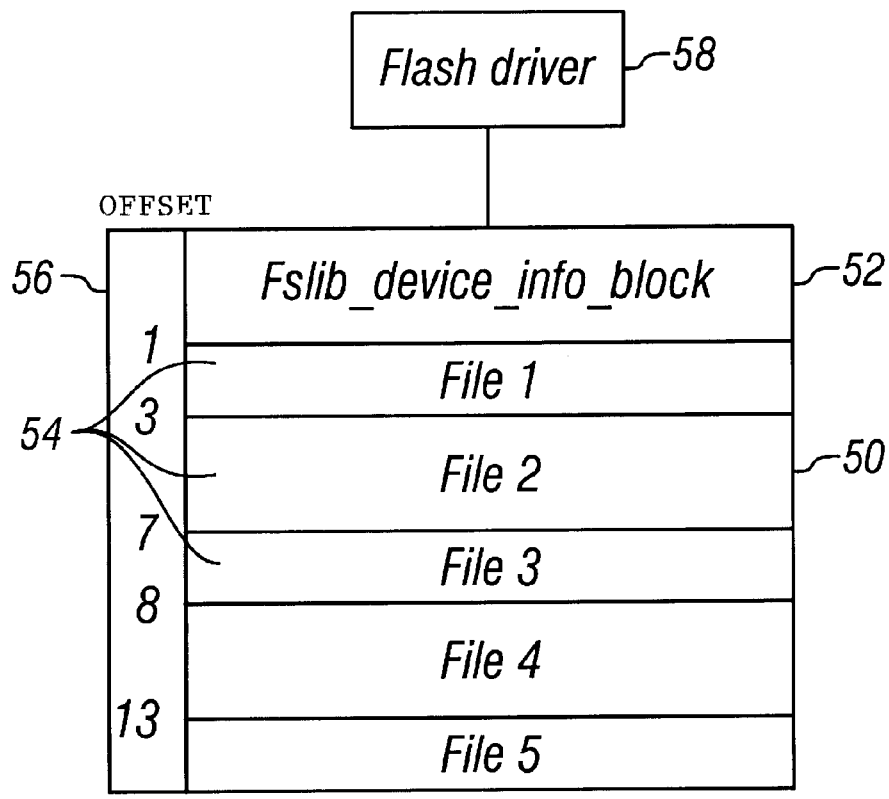
FIG. 2 is a diagram of a flash card and a flash card accessing module as typically used in IOS software.
Figure 3:
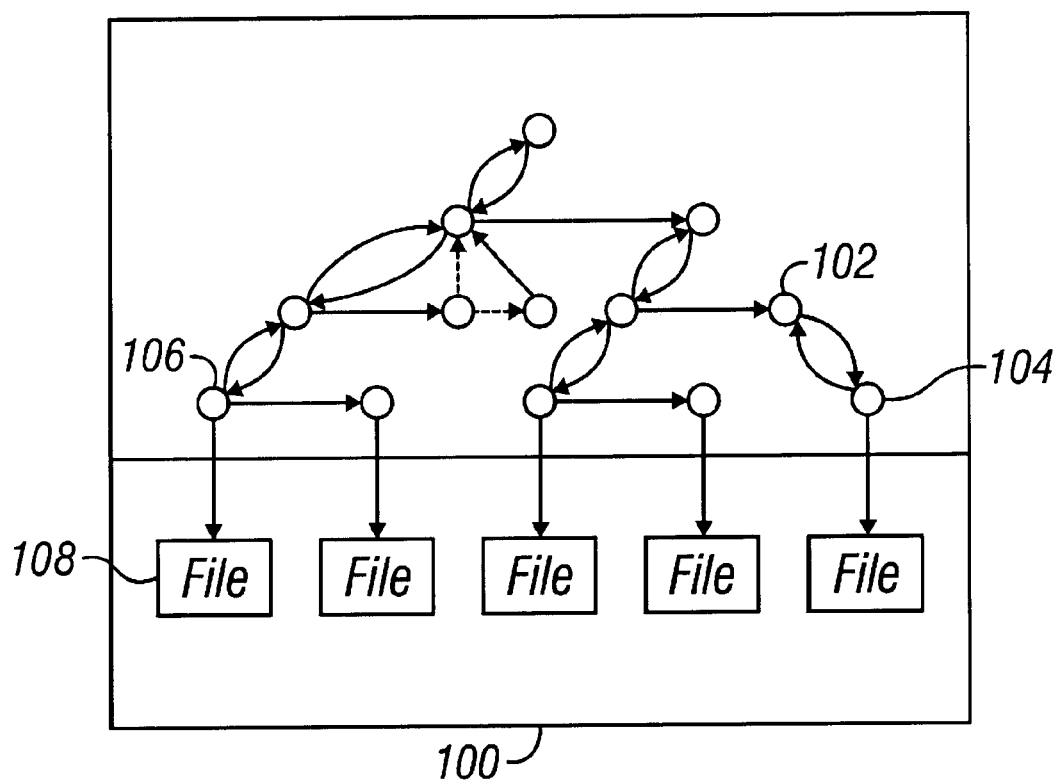
FIG. 3 is a block diagram illustrating a hypothetical flash file system, where hierarchical directory information is stored on the flash cards.

One potential solution to the problem of having a flash file system compatible with modular IOS software would be to store hierarchical directory information on the flash cards themselves. FIG. 3 is a block diagram illustrating this type of design. Flash card 100 contains a hierarchical data structure such as a tree 102. Each node 104 on the tree 102 may represent a directory or subdirectory name, and leaf nodes 106 may contain pointers to the locations of particular files 108.

While this solution allows for modular IOS software, and provides the ability to have flexibility of directory naming, it suffers from several drawbacks. First, flash card memory is somewhat slow to access. Therefore, it would take a device much more time to access a file, as it would first have to search through a directory structure such as a tree located on the flash card, and then additionally access the file.

Second, this solution does not allow for backwards compatibility. There are many flash cards already in use which utilize the old flash file system. Many user will not want to upgrade all of their equipment in order to run the new modular IOS software on it. It would be more beneficial to have a solution which allowed current flash cards to be used, without the need for upgrade.

Figure 4:
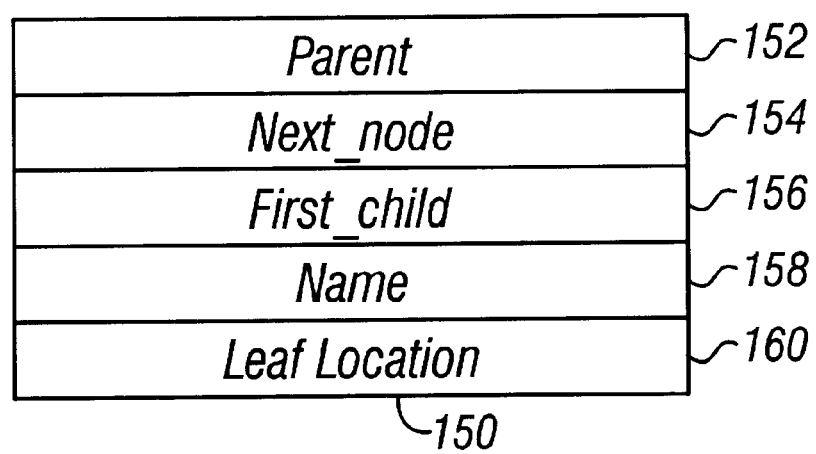
FIG. 4 is a block diagram illustrating the structure of a node in a tree directory structure according to a presently preferred embodiment of the present invention.

The present invention may reside in a thin software layer in the IOS of a network. The present invention provides for maintaining the directory structure in RAM, rather than on the flash card. This allows for all the advantages of having a full directory structure, as well as the high access speed of RAM and backwards compatibility with older flash cards. The directory structure may comprise a "tree" structure, or it may comprise another structure for maintaining a directory as known in the art. FIG. 4 is a block diagram illustrating the structure of a node in the tree directory structure according to a presently preferred embodiment of the present invention. A node may represent a directory or a file (one that represents a file may be termed a "leaf" node). Node 150 may contain a parent field 152, which contains a pointer to a parent node, as well a next_node field 154 which points to the next node within the directory corresponding to the parent node (the next peer within that directory, if any more exist). A NULL in the parent field indicates the node is the root. If the node 150 contains children (i.e. if it corresponds to a directory which contains at least one subdirectory or file), first_child field 156 is used to point to the first child node within that directory, otherwise it contains NULL. A name field 158 may also be provided to allow the individual directories or files to be named, and thus searched easily. If the node is a leaf node, an offset value is provided in a leaf location field 160, which points to the exact file corresponding to that leaf node.

Since the directory structure will be stored in RAM, when power is interrupted to the system, the information will likely be lost, as RAM is generally a volatile memory. Therefore, there must be a non-volatile memory location where directory information may be stored on a more permanent basis. In a presently preferred embodiment of the present invention, directory information is stored within the files on the flash cards themselves. A name field in the header of a file, which was previously only used to store a simple file name, may be utilized to store absolute path name information, including directory and subdirectory information. For example, a file named "file2" stored in the subdirectory "configuration_files" in the directory "config", may have a name field storing "config/configuration_files/file2".

Figure 5:
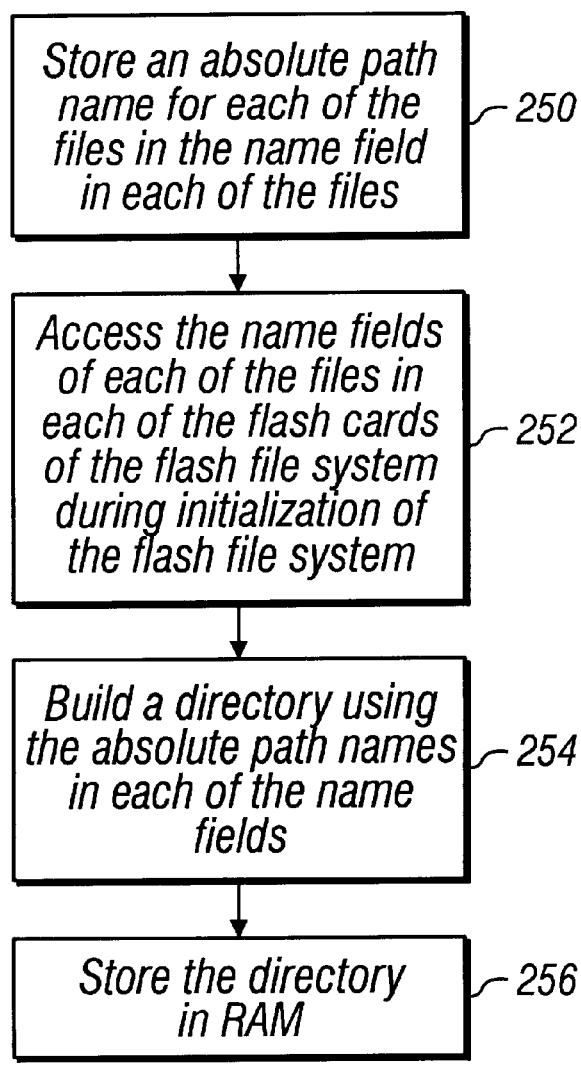
FIG. 5 is a flow diagram illustrating a method for creating a directory structure for a flash file system according to a presently preferred embodiment of the present invention.

FIG. 5 is a flow diagram illustrating a method for creating a directory structure for a flash file system according to a presently preferred embodiment of the present invention. At 250, an absolute path name for each of the files may be stored in the name field in each of the files. This will likely be performed when a file is created, however it may also be performed at other times, like when a file is moved to a new location or is renamed, or when a flash card originally designed for an older IOS is placed in a system that utilizes the newer, modular IOS. At 252, when the flash file system is initialized (for example, when the device is powered on), the IOS may begin to create the directory structure in RAM. The name fields in each of the files in one or more of the flash cards in the system are accessed. At 254, the absolute path names in each of the name fields are used to build a directory structure. In a presently preferred embodiment of the present invention, the directory structure is a tree, with each node in the tree of the format described above. At 256, the directory is stored in RAM.

The directory may be modified and deleted by moving nodes, changing pointers, and other tree modification techniques. When directory information is changed, corresponding absolute path names in name fields of files on flash cards must also be changed.

Figure 6:
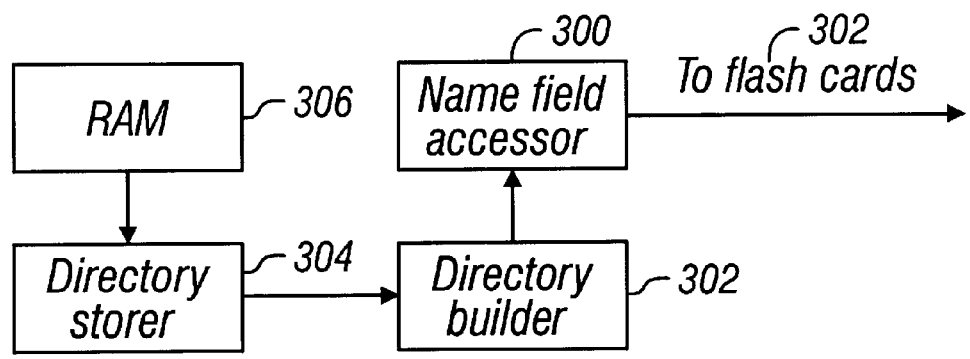
FIG. 6 is a block diagram illustrating a flash file system according to a presently preferred embodiment of the present invention.

FIG. 6 is a block diagram illustrating a flash file system according to a presently preferred embodiment of the present invention. Name field accessor 300 may be coupled to flash cards 302, and may access the name fields of each of the files in one or more of the flash cards of the flash file system during initialization for the flash file system. Directory builder 302 may be coupled to name field accessor 300, and may build a directory using the absolute path names in each of the name fields. Directory storer 304 may be coupled to directory builder 302 and also to RAM 306, and may store the directory in RAM 306.

By keeping the directory structure in RAM, IOS may quickly traverse the directory tree, needing to access the slower flash cards only when the precise file and location of the file on the flash card is known, greatly enhancing the speed of the system. Additionally, flash cards used with older, outdated IOS software will still be compatible with current IOS software because the only required change is to place absolute path name information in the name field of each file. Directory names are flexible as well, even the directory name indicating the name of the card may be modified.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for creating a directory structure for a flash file system, the flash file system having one or more flash cards with files on them, said files each having a name field with an absolute path name, the method comprising:

accessing the name fields of each of the files in one or more of the flash cards of the flash file system during initialization of flash file system;

building a directory having tree structure using the absolute path names in the name fields; and storing said directory in RAM, wherein said tree structure includes a plurality of nodes, each of said nodes containing a parent field and one or more child fields, said parent field containing a pointer to a parent node if the node has a parent, said one or more child fields containing pointers to child nodes if the node has one or more children, and said one or more child fields containing a pointer to a file on a flash card if the node has no children.

2. The method of claim 1, wherein each of said absolute path names comprises:

information on the directory and any subdirectories in which the file is to be stored; and the name of the file.

3. A method for maintaining a directory structure for a flash file system, the flash file system having one or more flash cards with files on them, each of the files having a name field, the method comprising:

storing an absolute oath name for each of the files in the name field in each of the files;

accessing the name fields of each of the files in one or more of the flash cards of the flash file system during initialization of flash file system;

building a directory having a tree structure using the absolute oath names in the name fields; and storing said directory in RAM, wherein said tree structure includes a plurality of nodes, each of said nodes containing a parent field and a next node field, said parent field containing a pointer to a parent node, said next node field containing a pointer to a peer node, if any more exist, said node further having a first child field containing a pointer to a first child node if said node corresponds to a directory containing one or more subdirectories or files, said node further having a leaf location field containing a pointer to the location of the corresponding file if said node is a leaf node, and said node further having a name field containing a name for the directory or file corresponding to said node.

4. The method of claim 3, wherein each of said absolute path names comprises:

information on the directory and any subdirectories in which the file is to be stored; and the name of the file.

5. A flash file system, including:

one or more flash cards, said flash cards having files on them, said files each having a name field with an absolute path name;

a name field accessor coupled to each of said flash cards;

a directory builder coupled to said name field accessor;

a RAM; and a directory storer coupled to said directory builder and to said RAM, wherein said directory builder creates a tree structure and said directory storer stores said tree structure in said RAM and wherein said tree structure includes a plurality of nodes, each of said nodes containing a parent field and a next node field, said parent field containing a pointer to a parent node, said next node field containing a pointer to a peer node, if any more exist, said node further having a first child field containing a pointer to a first child node if said node corresponds to a directory containing one or more subdirectories or files, said node further having a leaf location field containing a pointer to the location of the corresponding file if said node is a leaf node, and said node further having a name field containing a name for the directory or file corresponding to said node.

6. The flash file system of claim 5, wherein each of said files includes a name field having an absolute path name.

7. The flash file system of claim 6, wherein each of said absolute path names comprises:

information on the directory and any subdirectories in which the file is to be stored; and the name of the file.

8. An internetwork operating system, including:

one or more flash cards, said flash cards having files on them, said files each having a name field with an absolute path name;

a name field accessor module coupled to each of said flash cards;

a directory builder module coupled to said name field accessor;

a RAM; and a directory storer module coupled to said directory builder and to said RAM, wherein said directory builder module creates a tree structure and said directory storer module stores said tree structure in said RAM and wherein said tree structure includes a plurality of nodes, each of said nodes containing a parent field and a next node field, said parent field containing a pointer to a parent node, said next node field containing a pointer to a peer node, if any more exist, said node further having a first child field containing a pointer to a first child node if said node corresponds to a directory containing one or more subdirectories or files, said node further having a leaf location field containing a pointer to the location of the corresponding file if said node is a leaf node, and said node further having a name field containing a name for the directory or file corresponding to said node.

9. The internetwork operating system of claim 8, wherein each of said files includes a name field having an absolute path name.

10. The internetwork operating system of claim 9, wherein each of said absolute path names comprises:

information on the directory and any subdirectories in which the file is to be stored; and the name of the file.

11. A program storage device readable by a machine, tangibly embodying a program of instructions executable by the machine to perform method steps for creating a directory structure for a flash file system, the flash file system having one or more flash cards with files on them, said files each having a name field with an absolute path name, the method comprising:

accessing the name fields of each of the files in one or more of the flash cards of the flash file system during initialization of flash file system;

building a directory having a tree structure using the absolute path names in the name fields; and storing said directory in RAM wherein said tree structure includes a plurality of nodes, each of said nodes containing a parent field and a next node field, said parent field containing a pointer to a parent node, said next node field containing a pointer to a peer node, if any more exist, said node further having a first child field containing a pointer to a first child node if said node corresponds to a directory containing one or more subdirectories or files, said node farther having a leaf location field containing a pointer to the location of the corresponding file if said node is a leaf node, and said node father having a name field containing a name for the directory or file corresponding to said node.

12. The program storage device of claim 11, wherein each of said absolute path names comprises:

information on the directory and any subdirectories in which the file is to be stored; and the name of the file.

13. A program storage device readable by a machine, tangibly embodying a program of instructions executable by the machine to perform method steps for maintaining a directory structure for a flash file system, the flash file system having one or more flash cards with files on them, each of the files having a name field, the method comprising:

storing an absolute oath name for each of the files in the name field in each of the files;

accessing the name fields of the files in one or more of the flash cards of the flash file system during initialization of flash file system;

building a directory having a tree structure using the absolute path names in the name fields; and storing said directory in RAM wherein said tree structure includes a plurality of nodes, each of said nodes containing a parent field and a next node field, said parent field containing a pointer to a parent node, said next node field containing a pointer to a peer node, if any more exist, said node further having a first child field containing a pointer to a first child node if said node corresponds to a directory containing one or more subdirectories or files, said node further having a leaf location field containing a pointer to the location of the corresponding file if said node is a leaf node, and said node further having a name field containing a name for the directory or file corresponding to said node.

14. The program storage device of claim 13, wherein each of said absolute path names comprises:

information on the directory and any subdirectories in which the file is to be stored; and the name of the file.

15. A flash file system for creating a directory structure for a flash file system, the flash file system having one or more flash cards with files on them, said files each having a name field with an absolute path name, the method comprising:

means for accessing the name fields of each of the files in one or more of the flash cards of the flash file system during initialization of flash file system;

means for building a directory having a tree structure using the absolute path names in the name fields; and means for storing said directory in RAM wherein said tree structure includes a plurality of nodes, each of said nodes containing a parent field and one or more child fields, said parent field containing a pointer to a parent node if the node has a parent, said one or more child fields containing pointers to child nodes if the node has one or more children, and said one or more child fields containing a pointer to a file on a flash card if the node has no children.

16. The flash file system of claim 15, wherein each of said absolute path names comprises:

information on the directory and any subdirectories in which the file is to be stored; and the name of the file.

17. A flash file system for maintaining a directory structure for a flash file system, the flash file system having one or more flash cards with files on them, each of the files having a name field, the method comprising:

means for storing an absolute path name for each of the files in the name field in each of the files;

means for accessing the name fields of each of the files in one or more of the flash cards of the flash file system during initialization of flash file system;

means for building a directory having a tree structure using the absolute path names in the name fields; and means for storing said directory in RAM, wherein said tree structure includes a plurality of nodes, each of said nodes containing a parent field and a next node field, said parent field containing a pointer to a parent node, said next node field containing a pointer to a peer node, if any more exist, said node further having a first child field containing a pointer to a first child node if said node corresponds to a directory containing one or more subdirectories or files, said node further having a leaf location field containing a pointer to the location of the corresponding file if said node is a leaf node, and said node further having a name field containing a name for the directory or file corresponding to said node.

18. The flash file system of claim 17, wherein each of said absolute path names comprises:

information on the directory and any subdirectories in which the file is to be stored; and the name of the file.

* * * * *

UNITED STATES PATENT AND TRADEMARK OFFICE
CERTIFICATE OF CORRECTION

PATENT NO. : 6,480,864 B1
DATED : November 12, 2002
INVENTOR(S) : Albert Meng Fong and Pradeep K. Kathail It is certified that error appears in the above-identified patent and that said Letters Patent is hereby corrected as shown below:

Column 5,
Line 15, between "having" and "tree" please insert -- a --
Lines 35 and 41, replace "oath" with -- path --

Column 7,
Line 14, replace "farther" with -- further --
Line 17, replace "farther" with -- further --
Line 30, replace "oath" with -- path --

Signed and Sealed this

Fourth Day of March, 2003

JAMES E. ROGAN
*Director of the United States Patent and Trademark Office*